United States Patent [19]

Hahn et al.

[11] 4,061,432

[45] Dec. 6, 1977

[54] RELEASABLE LOCK FOR EXCAVATING TOOTH

[75] Inventors: Frederick C. Hahn; Larren F. Jones, both of Aloha, Oreg.

[73] Assignee: Esco Corporation, Portland, Oreg.

[21] Appl. No.: 679,210

[22] Filed: Apr. 22, 1976

[51] Int. Cl.² ................................................. B25G 3/36
[52] U.S. Cl. ................................ 403/318; 37/142 R; 403/379
[58] Field of Search .......................... 37/142 R, 142 A; 172/713, 719, 753; 403/379, 318, 316

[56] References Cited

U.S. PATENT DOCUMENTS

| | | | |
|---|---|---|---|
| 2,919,506 | 1/1960 | Larsen | 37/142 A |
| 3,079,710 | 3/1963 | Larsen et al. | 37/142 R |
| 3,082,555 | 3/1963 | Hill | 37/142 R |
| 3,126,654 | 3/1964 | Eyolfson et al. | 37/142 R |
| 3,572,785 | 3/1971 | Larson | 37/142 A X |
| 3,839,806 | 10/1974 | Hood | 37/142 R |

Primary Examiner—Andrew V. Kundrat
Attorney, Agent, or Firm—Tilton, Fallon, Lungmus, Chestnut

[57] ABSTRACT

A releasable lock for an excavating tooth employing a pin and plug wherein each of these elements is equipped with a plurality of angularly related planar surfaces arranged to provide alternating crests and valleys.

4 Claims, 10 Drawing Figures

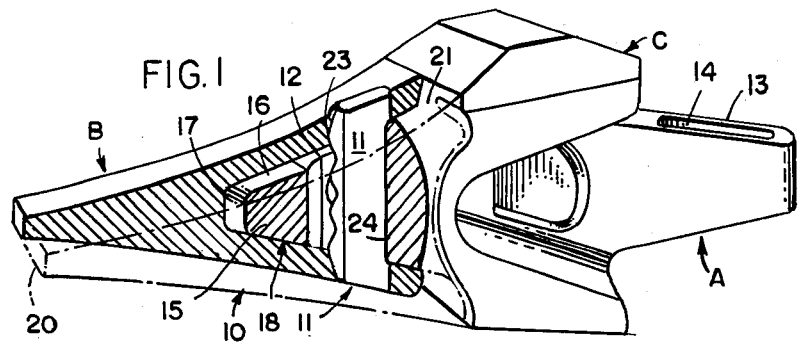
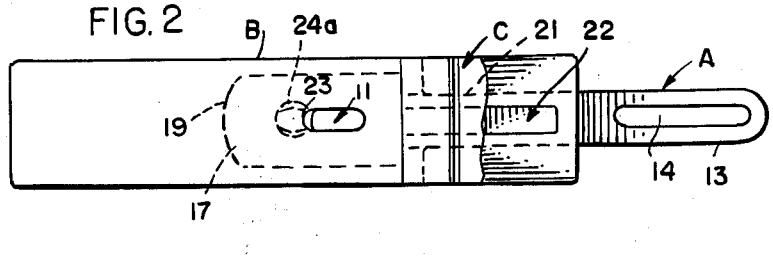
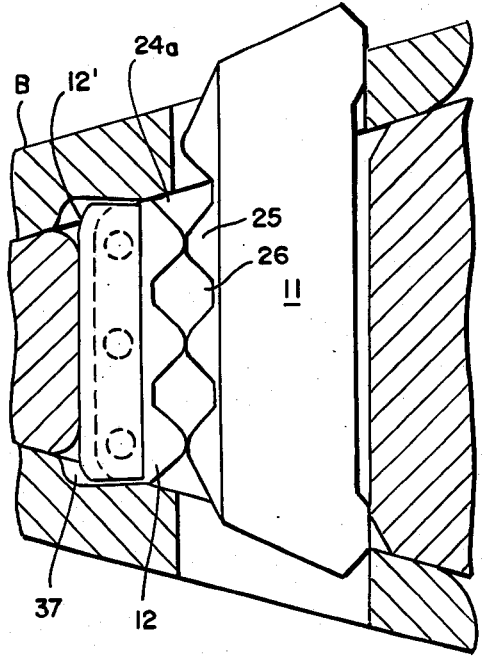
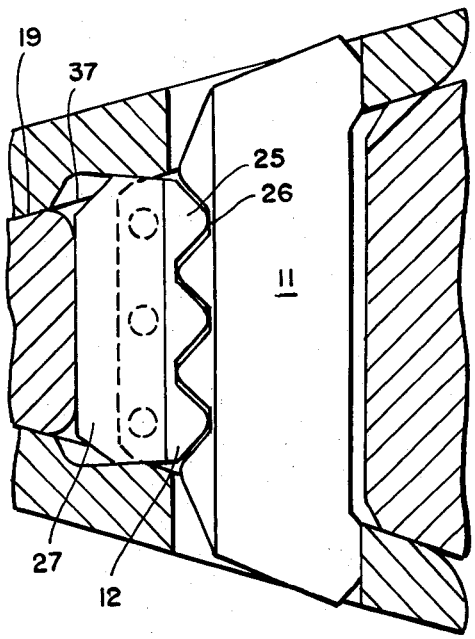

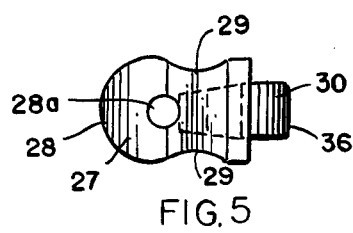
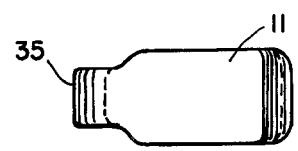
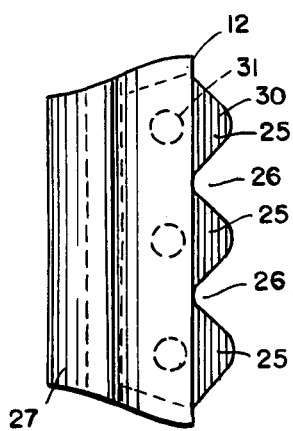
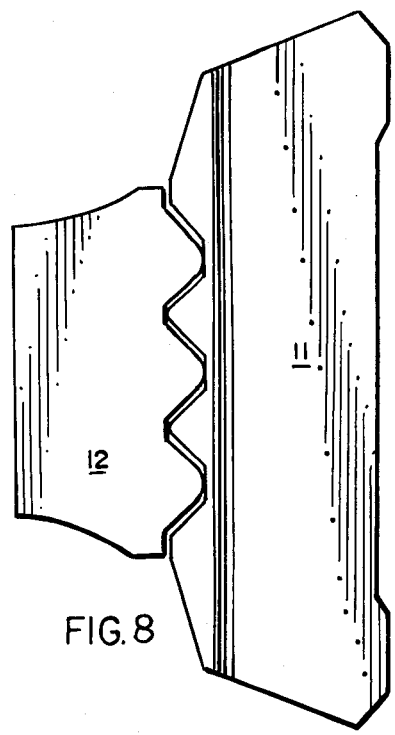
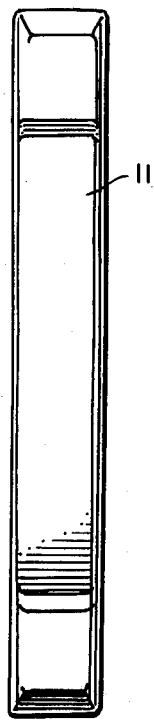
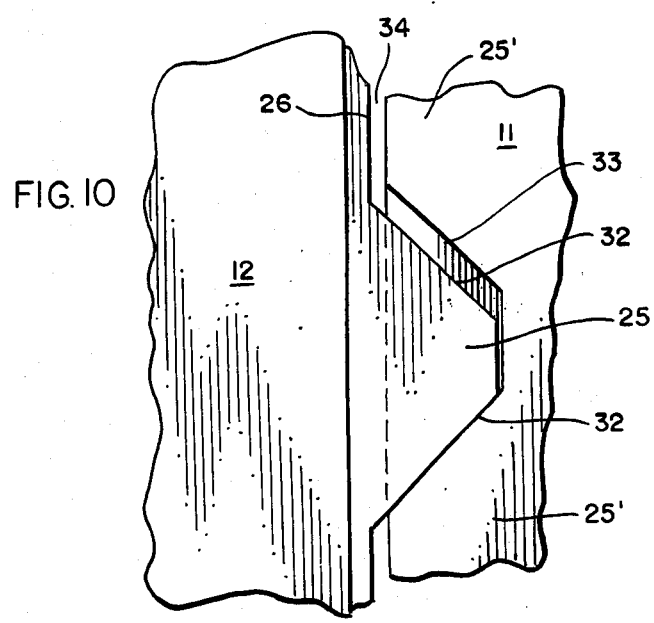

RELEASABLE LOCK FOR EXCAVATING TOOTH

BACKGROUND AND SUMMARY OF INVENTION

This invention relates to a releasable lock for an excavating tooth and, more particularly, to a lock wherein the pin and plug have unique confronting, interengaging faces.

This invention is an improvement on co-owned U.S. Pat. No. 3,126,654 which in turn constituted an improvement over co-owned U.S. Pat. No. 2,919,506.

As was brought out in the above-mentioned U.S. Pat. No. 3,126,654 patent, locking devices for excavating teeth have had to resolve two conflicting objectives, i.e., providing a secure lock to withstand severe shocks encountered during earth working yet be readily disassembleable for the replacement of the wearable point. In large measure this has been achieved by the "corrugated" lock of the above-mentioned patents. However, in certain severe environments, the corrugated locks have not performed their intended function. Severe shock or impact blows have, on occasion, caused the pins literally to be "squirted" out of their engagement with the mating plug — thereby bringing about a situation frequently encountered in the prior art and which normally was solved by deforming an end portion of the pin. This, of course, resulted in greater security of installation but frustrated the achievement of quick replaceability. It will be appreciated that where the work is so severe as to disassemble the lock, as mentioned above, the equipment used therefor is usually of a rugged and expensive nature so that the additional downtime required for burning, chipping, chiseling or otherwise removing the locking pin, is quite expensive. On the other hand, if the lock is not absolutely secure, loss of the removably mounted point can result in serious damage to the adapter and again valuable time is lost in the replacement.

This dilemma has been resolved according to the invention which employs unique angularly related substantially rigid planar surfaces forming alternating crests and valleys on both the pin element and the plug element. When lock elements according to the invention are employed in the above-described severe operating conditions, the previous experience of lock loss has been remedied. The provision of such an advantageous locking device constitutes an important object of the invention. Other objects and advantages of the invention may be seen in the details of the ensuing specification.

DETAILED DESCRIPTION

The invention is described in conjunction with an illustrative embodiment in the accompanying drawing, in which FIG. 1 is a perspective view, partially broken away, of an excavating tooth incorporating features of the invention;

FIG. 2 is a top plan view, also partially broken away, of the composite tooth of FIG. 1;

FIG. 3 is a fragmentary longitudinally sectional view of the inventive lock shown in the process of being installed in a mating point and adapter;

FIG. 4 is a view similar to FIG. 3 but showing the lock elements in completed position;

FIG. 5 is a top plan view of the plug element of the lock;

FIG. 6 is a top plan view of the pin element of the lock;

FIG. 7 is a side elevational view of the plug element;

FIG. 8 is an enlarged side elevational view of the pin and plug elements in assembled relations;

FIG. 9 is an end elevational view of the pin element of FIGS. 6 and 8; and

FIG. 10 is an enlarged fragmentary side elevational view of a portion of the locking faces of the pin and plug elements.

In the illustration given, and with particular reference to FIG. 1, the symbol A designates generally an adapter provided as part of the composite tooth generally designated 10. The symbol B designates generally the point portion, while the symbol C designates a wear cap. The numeral 11 designates a locking pin or key, while the numeral 12 designates a key lock member of plug element.

The adapter A is equipped with a rearwardly-extending shank 13 suitably slotted as at 14 for attachment to the lip or other portion of an excavating device (not shown). The forward portion of the adapter A terminates in a nose 15, which is essentially wedge-shaped, being defined in part by wedge surfaces 16 (only the upper one of which is designated in FIG. 1). In the illustration given, the nose 15 terminates in a generally box-shaped apex 17, which is described in greater detail in U.S. Pat. No. 3,079,710. Reference to that case may be had for additional details of construction not set forth herein.

Further characterizing the interconnected nose 15 and point B, the surfaces 16 of the nose 15 and the confronting surfaces 18 of the socket generally designated 19 of the point B, may have a conical shape of the character described in detail in U.S. Pat. No. 2,919,506.

The point B is seen to be essentially symmetrical about a midplane passing through the tip 20 of the point B and thus the point B is reversible to equalize wear on the upper and lower sides thereof. Wear on the upper portion of the adapter A is minimized through the provision of the wear cap C, which is equipped with a tongue 21 slidably received within a groove 22 provided in the upper surface of the adapter A, all of which can be seen in greater detail by reference to U.S. Pat. No. 3,082,555.

For the purpose of installing the key 11, the point B is equipped with upper and lower key-receiving, aligned openings 23. The adapter a is equipped with a vertically-extending opening 24 which is enlarged in the direction of the tip as at 24a (see FIG. 2) to provide a chamber for the receipt of the lock member 12. It will be seen that the recess 24 is thus longitudinally enlarged relative to the openings 23 and in the direction of the tip 20. The enlarged opening 24 (including the portion 24a) extends between the surfaces 16, as also can be appreciated from FIG. 1.

A comparison of FIGS. 3 and 4 illustrates the method of assembly of the pin and plug elements 11 and 12, respectively. Each element is equipped with alternating crests and valleys as at 25 and 26 which meet when the elements are in assembled, locked condition — see FIG. 4. During the assembly procedure, the plug element deforms as at 12' (see FIG. 3) this being possible because of the construction of the main body portion 27 of the plug element — advantageously of molded rubber or like resilient material.

The details of construction of the plug element 12 can be better appreciated from a consideration of FIGS. 5 and 7 on the second drawing sheet. The resilient body 27 of the plug 12 is semi-cylindrical in shape at its forward end as at 28 (see FIG. 5). Additionally, the resilient body is equipped with longitudinally-extending recesses 29 which permit the flexure above described during assembly. The resilient material is molded with a rigid insert 30 firmly anchored therein and for this purpose, the insert piece which advantageously may be of steel is equipped with transverse bores as at 31 permitting the resilient material during molding to flow therethrough and achieve a secure anchorage of the insert piece 30 in the plug body 27. Additionally, the body 27 has a longitudinally extending recess or bore 28a which permits the resilient material to flex during assembly and disassembly.

As mentioned before, the plug element 12 and, more particularly, the insert piece 30 is equipped with alternating crests and valleys 25 and 26. Each crest 25 (and, therefore, each valley 26) is defined by angularly related planar surfaces 32 (see FIG. 10). Advantageously in the illustration given, the surfaces are arranged at 45 degrees to the length of the element, i.e., both the pin element 11 and the plug element 12 being relatively elongated. As can be appreciated from a consideration of FIG. 10, a space 33 is provided between the crest 25 of the plug element 12 and the adjacent crest of the pin element 11 — designated 25'. Normally, this space will be of the order of about 0.050 inches (approximately 1mm), the distance being measured in a direction perpendicular to the surfaces 32. This allows for a vertical pin appropriately greater and in a direction depending upon the load imposed. Thus, we have provided a locking system with a built-in tolerance so that resistance to initial stress is cushioned, in effect.

In the illustration given, the crests 25' are of lesser height than the crests 25, i.e., have lesser tip to root dimensions so as to develop a corresponding space between each crest 25 and its confronting valley 26 — as at 34 (still referring to FIG. 10).

In contrast to the prior art locks, there must be a substantial and continuing shock loading to pass the crest of one element past the crest of the other element — in particular, there is avoided the smooth rolling cam type of disengagement possiblity characteristic of the locking device of prior U.S. Pat. No. 3,126,654.

Returning to FIGS. 5 and 7, it will be noted that the insert piece 30 is relatively narrower than the plug body 27 in which it is firmly anchored. A corresponding narrowing is provided in the portion of the pin element 11 providing the confronting faces insures that a firm reliable interlock is provided. Each of the faces (35 relative to the pin element 11 and 36 relative to the plug element 12) is of a rigid character — stemming from the use of steel or like rigid material. Alternatively, it is possible to use, for example, a plurality of insert pieces 30 to provide the face 36.

Turning to FIGS. 3 and 4, it will be noted that the adapter opening 24a confronts recesses 37 provided in the socket 19 of the point B. This allows for the flexure of the plug body 27 as can be appreciated from a consideration of FIGS. 3 and 4.

The inventive assembly, in the commercial form differs from the prior art in providing a total takeup between the pin and plug of 0.19 inches as contrasted to 0.09 inches. This means that there is more than twice the engagement in the inventive construction so that twice as much horizontal displacement is required of the resilient material and the mating end of the attached metal insert to allow the pin to be removed from the pointed nose assembly. More particularly, when the force for removal is applied at an angle of 28° (corresponding to standard design), the resistance to removal in the inventive construction is theoretically approximately 1.7 that of the resistance to removal of the prior art lock. However, it will be appreciated that the axial force to remove the inventive pin is going to be considerably more when considering the additional horizontal engagement that must be overcome as well as the additional frictional resistance. As an example, on one size of point and nose assembly, it takes five and one-half times more static force to start pin removal of the ratchet type lock of this invention as compared to the lobe type pin of U.S. Pat. No. 3,126,654.

This advantageous operation stems from the fact that the ratchet type of arrangement of the invention has much more takeup than the prior art arrangement. Because of the 45° reference bearing planes between the insert of the plug and the pin, there is present a high degree of resistance to movement of the inserted plug relative to the pin. This thereby inhibits the ability of the pin to be prematurely ejected. However, there is sufficient clearance provided between the two during assembly so that the pin and plug can float without abnormal loads developing there between or extra compression applied to the plug.

It will be appreciated that according to the picture embodiment, the lobes are provided on a unitary insert piece. This means that all three ratchet lobes cooperate to hole the pin in assembly, thereby increasing the tendency for the plug to resist premature or accidental movement. However, it should be appreciated that three separate inserts could be employed to advantage but by providing these in an integral form, the lockability of the arrangement is enhanced.

We claim:

1. A releasable lock for an excavating tooth comprising:

a generally resilient plug element having a generally rigid face;

a generally rigid, relatively elongated pin element having a generally rigid face for releasable locking engagement with the face of said plug element, and each of said element faces being equipped with a plurality of angularly related planar surfaces arranged to provide alternating crests and valleys in a direction parallel to the length of said pin element, said plug being equipped with a unitary relatively rigid insert, said insert being partially received and retained in said plug element and partially extending therefrom, the portion of said insert extending from said plug element being equipped with said face;

said plug element being relatively elongated in a direction parallel to the length of said pin element, said plug having longitudinally extending recess means in a wall thereof to accommodate flexure upon engagement with said pin element.

2. An excavating tooth structure comprising a nose-equipped adapter, said nose having an opening therein for the receipt of the plug and pin of a releasable lock, a point removably mounted on said nose and having openings therein alignable for the receipt of said pin, a plug in said adapter opening including a generally resilient body and a generally rigid insert, a pin in said nose and point aligned openings and including a generally rigid body and having a base positioned in confronting, engaging relation with a face of said insert, the faces of said pin and insert each being characterized by a plurality of angularly related planar surfaces arranged to provide alternating crests and valleys, said plug body being constructed of molded resilient material, said insert being molded therein and having a portion projecting therefrom, said insert projecting portion being relatively elongated in the direction of movement for mounting in said nose opening and having a width narrower than the width of said plug body, said plug body having longitudinally extending recess means therein to accommodate flexure of said body upon locking engagement of said faces.

3. An excavating tooth structure comprising a nose-equipped adapter, said nose having an opening therein for the receipt of the plug and pin of a releasable lock, a point removably mounted on said nose and having openings therein alignable for the receipt of said pin, a plug in said adapter opening including a generally resilient body and a generally rigid insert, a pin in said nose and point aligned openings and including a generally rigid body and having a base positioned in confronting, engaging relation with a face of said insert, the faces of said pin and insert each being characterized by a plurality of angularly related planar surfaces arranged to provide alternating crests and valleys, said point being equipped with a socket for receipt of said nose, said socket being recessed adjacent said point openings to provide surfaces for confining said plug, said plug having ends contoured to fit said socket surfaces.

4. A releasable lock for an excavating tooth comprising:
 a generally resilient plug element having a generally rigid face;
 a generally rigid, relatively elongated pin element having a generally rigid face for releasable locking engagement with the face of said plug element, and
 each of said element faces being equipped with a plurality of first and second angularly related planar surfaces arranged to provide alternating crests and valleys in a direction parallel to the length of said pin element, each crest having a tip and each valley having a base,
 the crests on one of said element having a height greater than that of the crests on the other of said elements, the valleys in said other element having a width greater than that of the valleys in said one element whereby when said elements are in locking engagement and the first planar surfaces of the crests of said one element contact the first planar surfaces of the valleys of said other element and the tips of the one element crests contact the bases of the other element valleys, the second planar surfaces of the one element crests are spaced from the second planar surfaces of the other element valleys to provide a slight floating movement of the pin and plug under initial application of a disassembling force.

* * * * *